United States Patent
Ponti (10) Patent No.: US 12,503,307 B2
(45) Date of Patent: Dec. 23, 2025

(54) STORAGE ASSEMBLY AND A METHOD FOR STORING ARTICLES INTERNALLY OF A STORAGE ASSEMBLY

(71) Applicant: C.M.C. S.p.A., Cerbara-Citta' di Castello (IT)

(72) Inventor: Giuseppe Ponti, Cerbara-Citta' di Castello (IT)

(73) Assignee: C.M.C. S.p.A. (IT)

( * ) Notice: Subject to any disclaimer, the term of this patent is extended or adjusted under 35 U.S.C. 154(b) by 910 days.

(21) Appl. No.: 17/764,806

(22) PCT Filed: Oct. 7, 2020

(86) PCT No.: PCT/IB2020/059398
§ 371 (c)(1),
(2) Date: Mar. 29, 2022

(87) PCT Pub. No.: WO2021/070068
PCT Pub. Date: Apr. 15, 2021

(65) Prior Publication Data
US 2022/0324649 A1    Oct. 13, 2022

(30) Foreign Application Priority Data
Oct. 7, 2019   (IT) .................. 102019000018074

(51) Int. Cl.
*B65G 1/06*   (2006.01)
*B60L 53/30*  (2019.01)
*B60M 7/00*   (2006.01)

(52) U.S. Cl.
CPC .............. *B65G 1/065* (2013.01); *B60L 53/32* (2019.02); *B60M 7/003* (2013.01)

(58) Field of Classification Search
CPC ....... B65G 1/065; B65G 1/0492; B60L 53/32; B60M 7/003; B60M 1/36; Y02T 10/70; Y02T 10/7072; Y02T 90/12
See application file for complete search history.

(56) References Cited

U.S. PATENT DOCUMENTS

| | | | |
|---|---|---|---|
| 2005/0047895 A1* | 3/2005 | Lert .................... | B65G 1/1378 414/273 |
| 2019/0177088 A1* | 6/2019 | Sullivan .............. | B65G 1/0492 |
| 2019/0245366 A1 | 8/2019 | Coady et al. | |

FOREIGN PATENT DOCUMENTS

| | | | | |
|---|---|---|---|---|
| CN | 109132302 A | * | 1/2019 | ........... B65G 1/0485 |
| DE | 102011014394 A1 | * | 9/2012 | ........... B65G 1/0485 |

(Continued)

*Primary Examiner* — Jacob S. Scott
*Assistant Examiner* — Erin Morris
(74) *Attorney, Agent, or Firm* — Endurance Law Group PLC (57) ABSTRACT

A storage assembly includes a shelf which has a plurality of planes and a plurality of supports for articles. The storage assembly further includes a sorting station for supplying and/or receiving articles; a transit area interposed between the shelf and the sorting station; a plurality of transport vehicles for transporting articles, each transport vehicle having a housing for receiving one or more articles; A second plurality of guides flank the supports and extend along the planes in order to guide the transport vehicles. A lift is provided for lifting a transport vehicle of the plurality of transport vehicles towards a plane of the plurality of planes, while lowering means are included for lowering the transport vehicle of the plurality of transport vehicles from the plane of the plurality of planes towards the transit area, after the transport vehicle has completely travelled along the plane of the plurality of planes.

10 Claims, 7 Drawing Sheets

(56) References Cited

FOREIGN PATENT DOCUMENTS

| | | | | |
|---|---|---|---|---|
| FR | 2915932 A1 | * | 11/2008 | .......... B60L 11/1811 |
| JP | 2003026307 A | | 1/2003 | |
| JP | 2011105499 A | | 6/2011 | |
| WO | WO-2011128384 A1 | * | 10/2011 | ........... B65G 1/0492 |
| WO | WO-2012123335 A1 | * | 9/2012 | ........... B65G 1/0485 |

* cited by examiner

STORAGE ASSEMBLY AND A METHOD FOR STORING ARTICLES INTERNALLY OF A STORAGE ASSEMBLY

FIELD OF THE INVENTION

The present invention relates to the technical sector concerning the transport of articles between one or more shelves and a sorting station, and storage of the articles in the supports of the shelves.

In particular, the present invention relates to a storage assembly and a method for storing articles internally of a storage assembly.

DESCRIPTION OF THE PRIOR ART

A storage assembly is known which comprises:
a shelf which in turn comprises: a plurality of planes; and
  a plurality of supports for supporting articles, which are arranged at the planes of the plurality of planes;
a sorting station for supplying articles to be deposited on the supports of the plurality of supports and/or for receiving articles in arrival from the supports of the plurality of supports;
a transit area which is interposed between the shelf and the sorting station.

Further, the known storage assembly comprises: a conveyor which is arranged at the shelf and which is suitable for moving the articles; a Cartesian robot which is arranged between the shelf and the conveyor, for picking up the articles from the conveyor and depositing them on the supports of the shelf and for picking up the articles from the supports of the shelf and releasing them on the conveyor; and a plurality of automated guided vehicles (AGV) for moving internally of the transit area and transporting the articles between the sorting station and the conveyor.

In detail, the Cartesian robot can translate along a horizontal direction (X) and a vertical direction (Z) to reach any support of the shelf, with the aim of depositing on that support one or more articles, or remove from that support one or more articles.

The articles can be arranged inside drawers or even on pallets: in that case, the supports of the shelf will be of such a dimension as to receive drawers or pallets and the drawers or pallets can also be moved by the Cartesian robot and the AGV.

Alternatively, the articles can be loose or be arranged in drawers which are permanently housed on the supports of the shelf and which are possibly only translated towards the outside of the shelf at the time of insertion or extraction of the articles into and out of the corresponding drawer.

A drawback of this storage assembly is its low productivity: in fact, the Cartesian robot takes a certain time to pick up one or more articles from the conveyor, to reach a support of the shelf, to deposit the one or more articles on the support of the shelf and to return towards the conveyor; in the meantime, other articles can be paused on the conveyor, awaiting depositing on the supports of the shelf. Like considerations are valid if the Cartesian robot is to pick up one or more articles from a support of the shelf and release them on the conveyor.

Increasing the movement velocity of the Cartesian robot only partially solves the above-described drawback, and at the same time creates a further drawback relating to a significant increase in costs.

Document WO 2012/123335 describes a further type of storage assembly having the same characteristics as set out in the preamble to independent claim 1.

SUMMARY OF THE INVENTION

In the light of the above, the aim of the present invention consists of increasing the productivity of the storage assembly.

The above aim is attained with a storage assembly according to claim 1, and a method for storing articles internally of a storage assembly according to claim 10.

A transport vehicle can be raised up to a determined plane of a shelf, can cross the plane from the first flank of the shelf up to reaching the support on which to deposit the articles (or the article), which it is carrying in its housing, can deposit the articles using the loading and unloading means, can continue along the same plane up to reaching the second flank of the shelf, and lastly, can be lowered towards the transit area in order to be supplied with further articles from the sorting station. Like considerations can be made if the transport vehicle is to collect articles from a support of a shelf and take them to the sorting station.

The above-described activity, performed by a single transport vehicle, can be carried out at the same time by a plurality of transport vehicles on all the planes of the shelf: as the transport vehicles must move from the first flank to the second flank of the shelf, it is even possible for more than on transport vehicle to operate on a same plane.

This advantageously significantly increases productivity with respect to the storage assembly of the prior art as described in the foregoing.

Further, the storage assembly and the method of the present invention ensure a continuous supply of the articles to be deposited in the shelf, with the aim of avoiding an accumulation of the articles in the sorting station, and the possibility of picking up the desired articles from the shelf, in a continuous way, by the transport vehicles, thus avoiding waiting times.

The electric battery of a transport vehicle of the plurality of transport vehicles is at least partially recharged while the transport vehicle is crossing a plane of the plurality of planes and to maximise the electrical recharging of the electric battery the advancing velocity of the transport vehicle can be regulated, so that there are no sudden halts of the plurality of transport vehicles. As the transport vehicles move in the same direction (i.e. from the first flank towards the second flank of the shelf), by regulating the advancement velocity of the transport vehicles it is certain that the desired articles can be picked up in continuous mode: in fact, a following transport vehicle will be able to reach a predetermined plane in which the transport vehicle is already present, with no need to wait for the transport vehicle to free the predetermined plane.

This is very advantageous because it avoids the use of electrical recharging stations at the transit area.

Further, what is described in the foregoing also guarantees a continuous supply of the articles to the machines arranged downstream of the storage assembly of the present invention.

BRIEF DESCRIPTION OF THE DRAWINGS

Specific embodiments of the invention will be described in the following part of the description, according to what is included in the claims and with the aid of the appended tables of drawings, in which:

DESCRIPTION OF THE PREFERRED EMBODIMENTS

With reference to the appended tables of drawings, reference numeral (1) denotes a storage assembly which is the object of the present invention, comprising:

- a shelf (2) which comprises: a first flank (2a) and a second flank (2b) which is opposite the first flank (2a); a plurality of planes (200); and a plurality of supports (20) for supporting articles (3), which are arranged at the planes (200a) of the plurality of planes (200);
- a sorting station (4) for supplying articles (3) to be deposited on the supports (20a) of the plurality of supports (20) and/or for receiving articles (3) in arrival from the supports (20a) of the plurality of supports (20);
- a transit area (5) which is interposed between the shelf (2) and the sorting station (4).

Further, the storage assembly (1) comprises:

- a plurality of transport vehicles (6) for transporting articles (3) between the sorting station (4) and the supports (20a) of the plurality of supports (20) of the shelf (2), each transport vehicle (6a) of the plurality of transport vehicles (6) comprising a housing (7) for receiving one or more articles (3);
- loading and unloading means (11) for loading at least an article (3a), which is arranged on a support (20a) of the plurality of supports (20), on a transport vehicle (6a) of the plurality of transport vehicles (6) and for unloading at least an article (3a), which is arranged on a transport vehicle (6a) of the plurality of transport vehicles (6), on a support (20a) of the plurality of supports (20);
- a plurality of guides (12) which are arranged flanked to the supports (20a) of the plurality of supports (20) and which extend along the planes (200a) of the plurality of planes (200) in order to guide the transport vehicles (6a) of the plurality of transport vehicles (6) so that the loading and unloading means (11) can carry out the loading and unloading operations of the articles (3);
- lifting means (13) which are arranged at the first flank (2a) of the shelf (2) for lifting a transport vehicle (6a) of the plurality of transport vehicles (6) towards a plane (200a) of the plurality of planes (200), and lowering means (14) which are arranged at the second flank (2b) of the shelf (2) for lowering the transport vehicle (6a) of the plurality of transport vehicles (6) from the plane (200a) of the plurality of planes (200) towards the transit area (5), after the transport vehicle (6a) has entirely travelled along the plane (200a) of the plurality of planes (200) (see FIGS. 1, 2, 4 and 5).

Each transport vehicle (6a) of the plurality of transport vehicles (6) comprises an electric battery (8) for electrically powering the transport vehicle (6a), a control unit (80) connected to the electric battery (8) for detecting the electrical charge status of the electric battery (8) and an electrical connector (9) which is connected to the electric battery (8) for electrically recharging the electric battery; the control unit (8) is programmed to regulate the velocity with which each transport vehicle (6a) will have to move along a predetermined plane (200a) of the plurality of planes (200).

Figure 4:
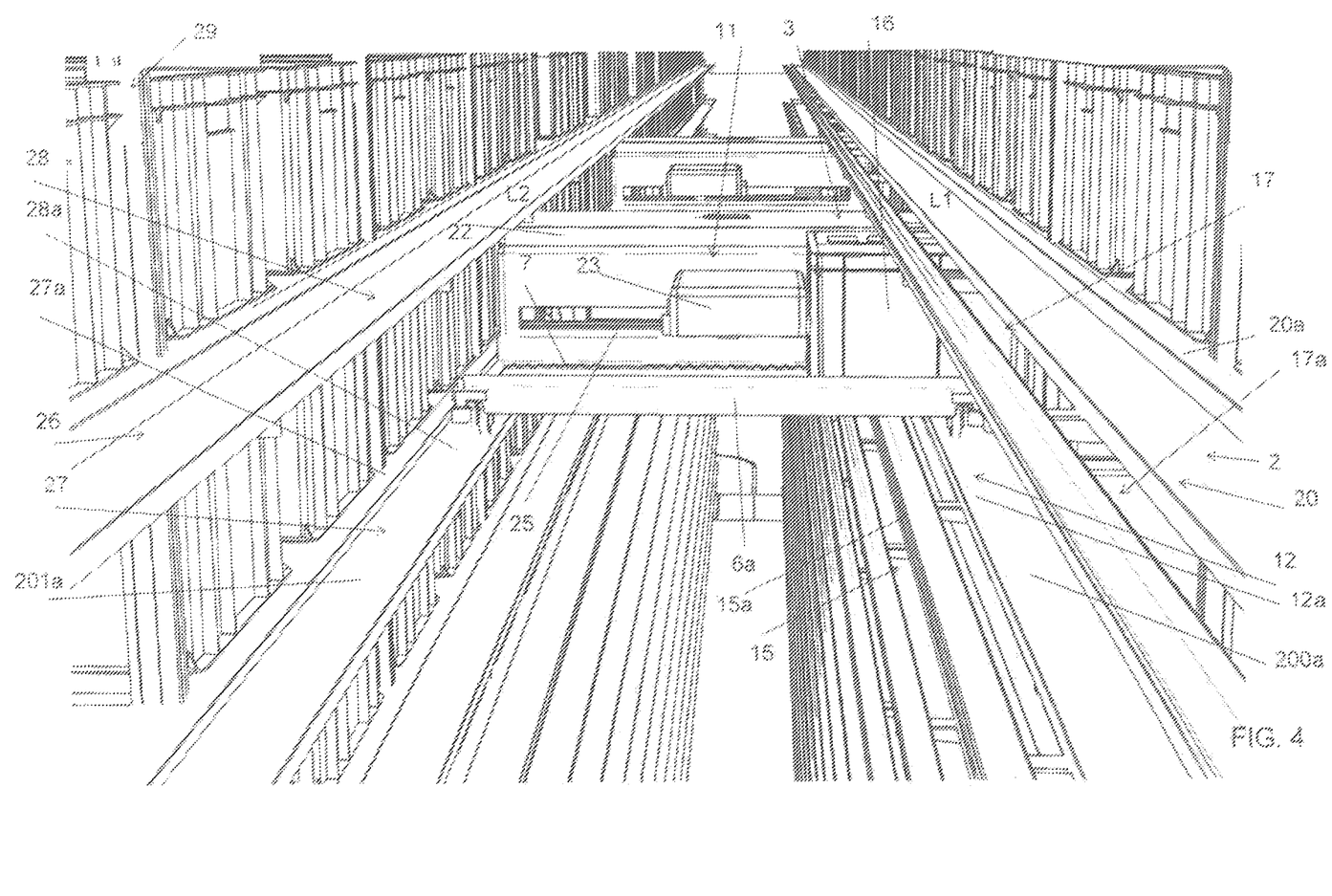
FIGS. 4, 5 and 6 are larger-scale perspective views of the storage assembly of FIGS. 1, 2, during consecutive operating steps.
Figure 4A:
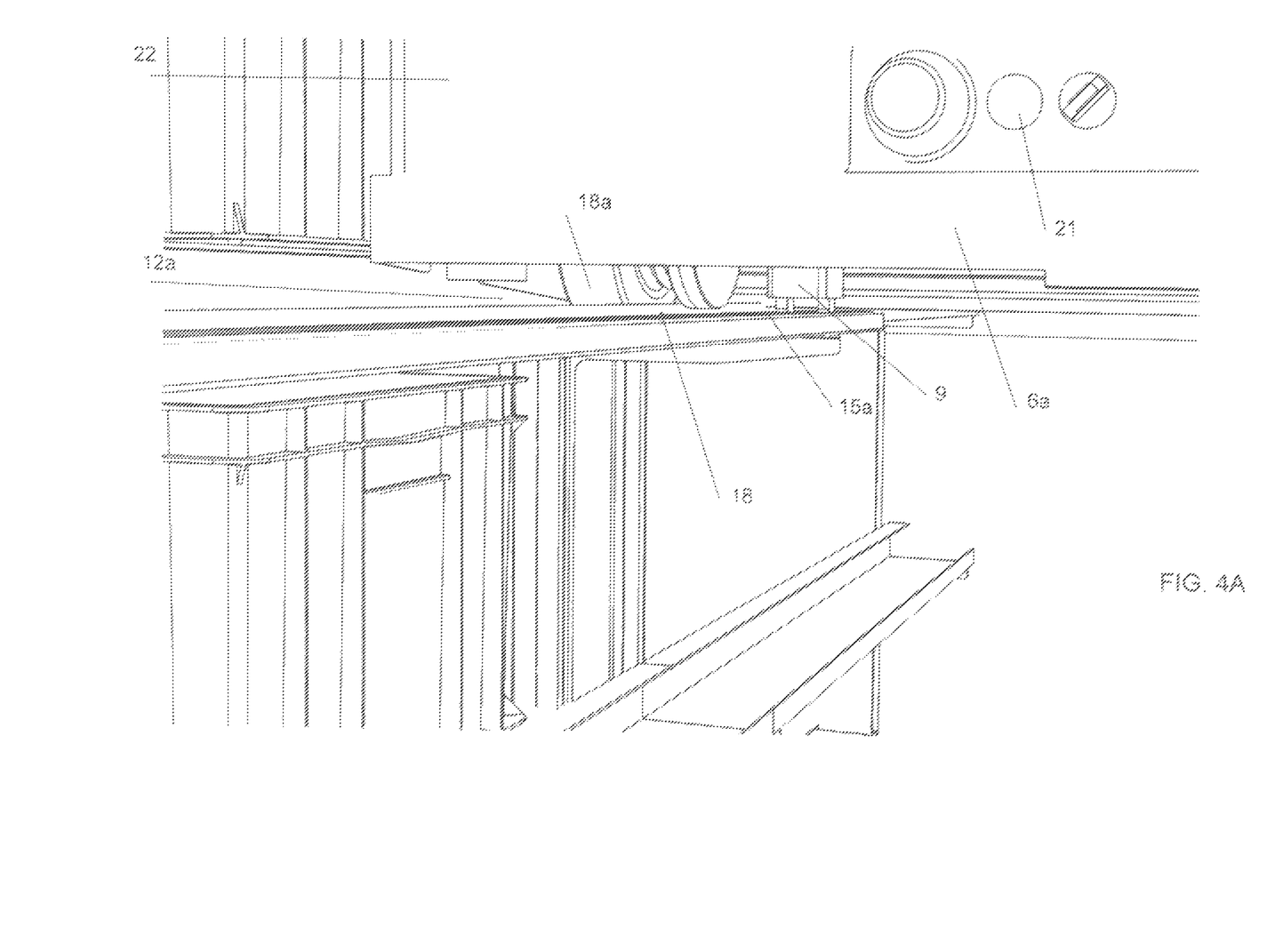
FIG. 4A is a perspective and further larger-scale view of a part of the transport vehicle of FIG. 4.

Further, the storage assembly (1) comprises a plurality of electrified tracks (15) which are arranged flanked to the guides (12a) of the plurality of guides (12) and which extend along each plane (200a) of the plurality of planes (200) of the shelf (2) and is configured so that, when a transport vehicle (6a) of the plurality of transport vehicles (6) runs along a predetermined plane (200a) of the plurality of planes (200), then the relative electrical connector (9) scrapes on a corresponding electrified track (15a) of the plurality of electrified tracks (15) thus determining the at least partial electrical recharging of the relative electric battery (8) (see FIG. 4A).

By way of example, the control unit (80) can be programmed to regulate the velocity with which each transport vehicle (6a) will have to move along a predetermined plane (200a) of the plurality of planes (200) with the aim of maximising the recharging of the relative electric battery (8).

Figure 1:
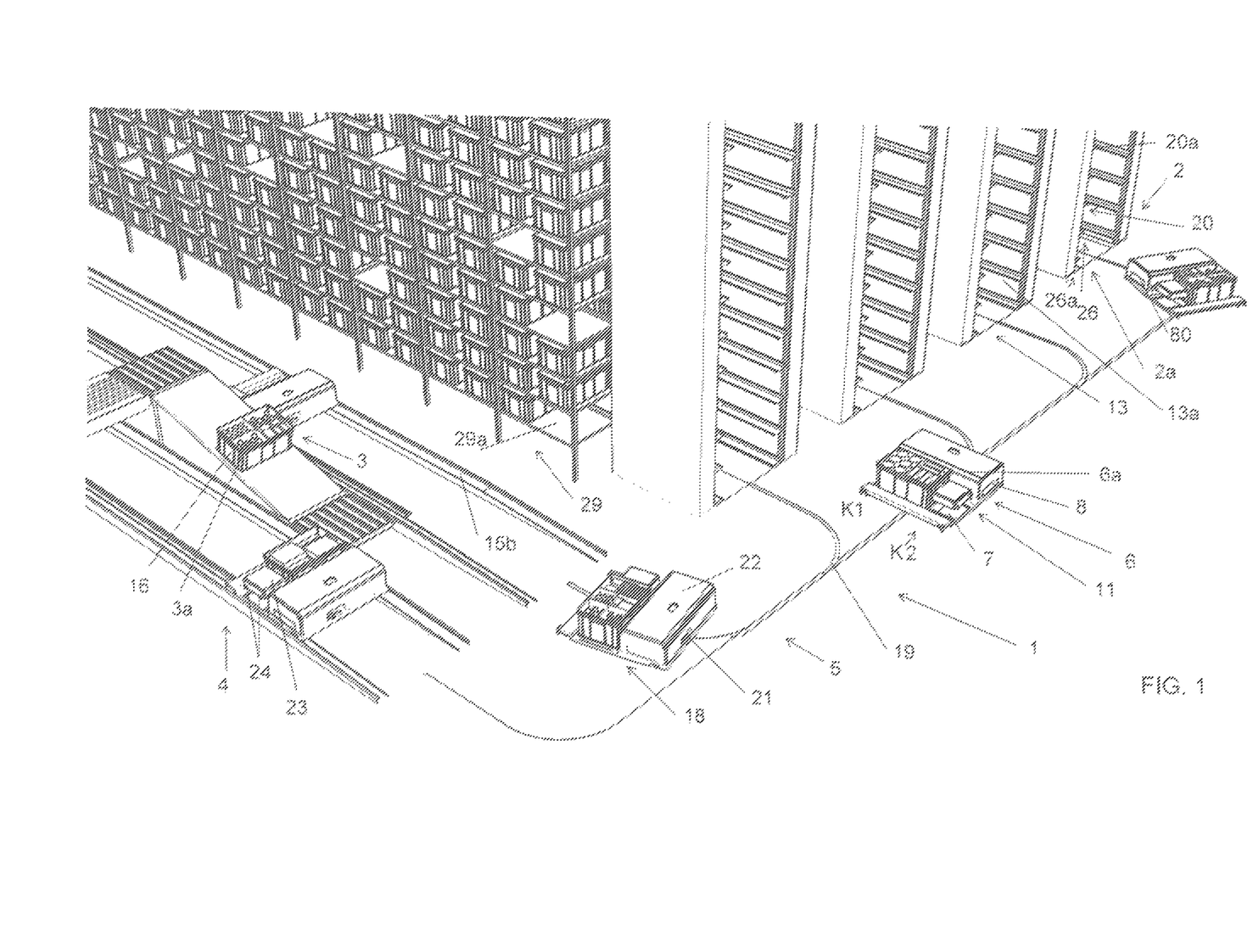
FIGS. 1 and 2 are two different perspective views of a storage assembly which is an object of the present invention, during operation and in two successive time instants.

With particular reference to FIG. 1, the sorting station (4) supplies articles (3) to be deposited on the supports (20a) of the plurality of supports (20) providing each transport vehicle (6a) of the plurality of transport vehicles (6) with a drawer (16) containing the articles (3).

The drawer (16) containing articles (3) can be arranged on the housing (7) of each transport vehicle (6a) in order to be transported into the transit area (5).

Figure 2:
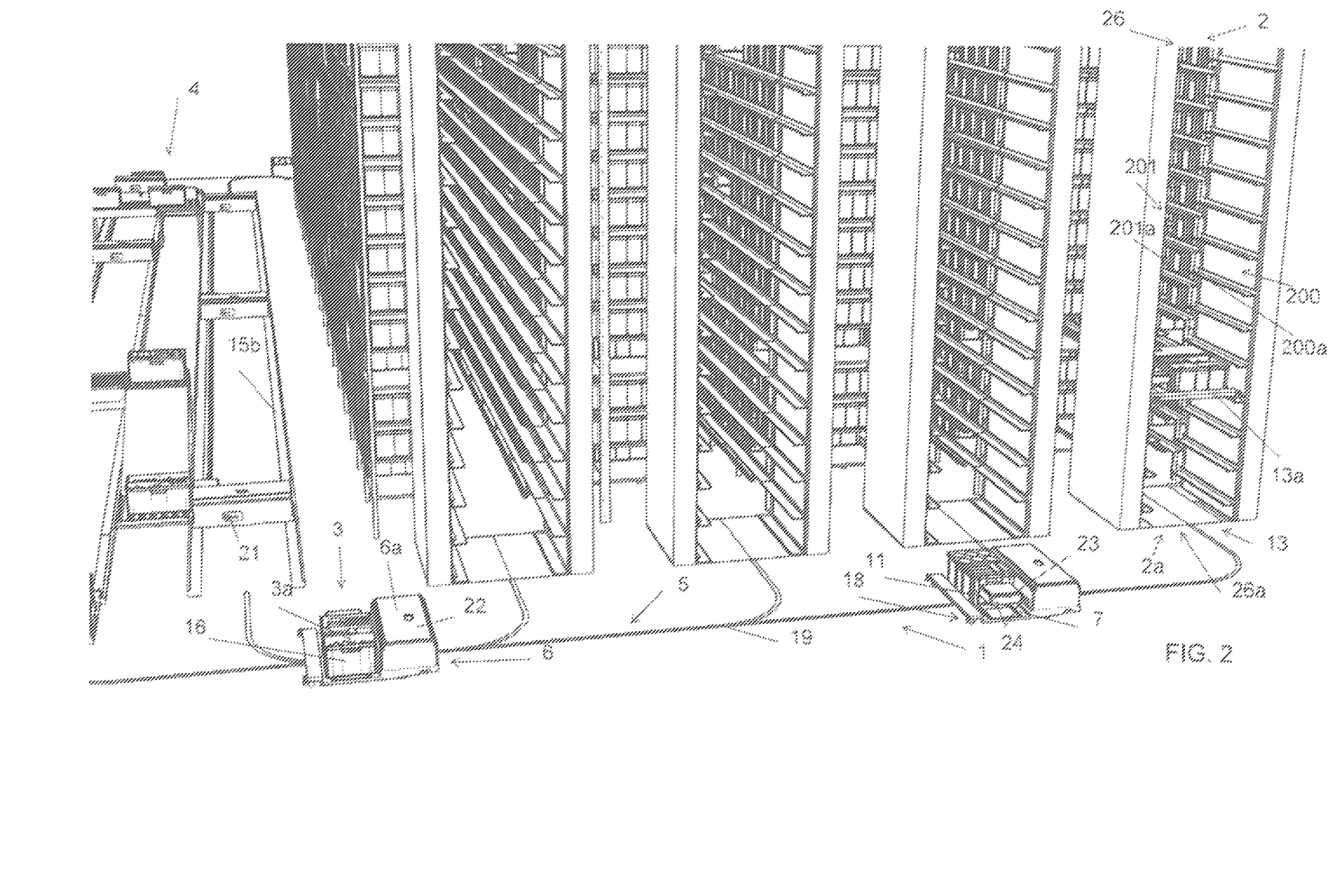

Each transport vehicle (6a) can cross the transit area (5) from the sorting station (4) to the shelf (2) or from the shelf (2) to the sorting station (4) (see FIG. 2).

By way of example, the loading and unloading means (11) can load the articles (3), which each transport vehicle (6a) will transport, from the sorting station (4).

Alternatively, the loading and unloading means (11) can load the articles (3), which each transport vehicle (6a) will transport, from a support (20a) of the plurality of supports (20).

Likewise, the loading and unloading means (11) can unload the articles (3), which each transport vehicle (6a) is transporting, onto a support (20a) of the plurality of supports (20).

Further, the loading and unloading means (11) can unload the articles (3), which each transport vehicle (6a) is transporting, onto the sorting station (4).

Each support (20a) of the second plurality of supports (20) can comprise a second plurality of seats (17) in which the articles (3) are arranged or will be arranged (see FIG. 4).

Figure 5:
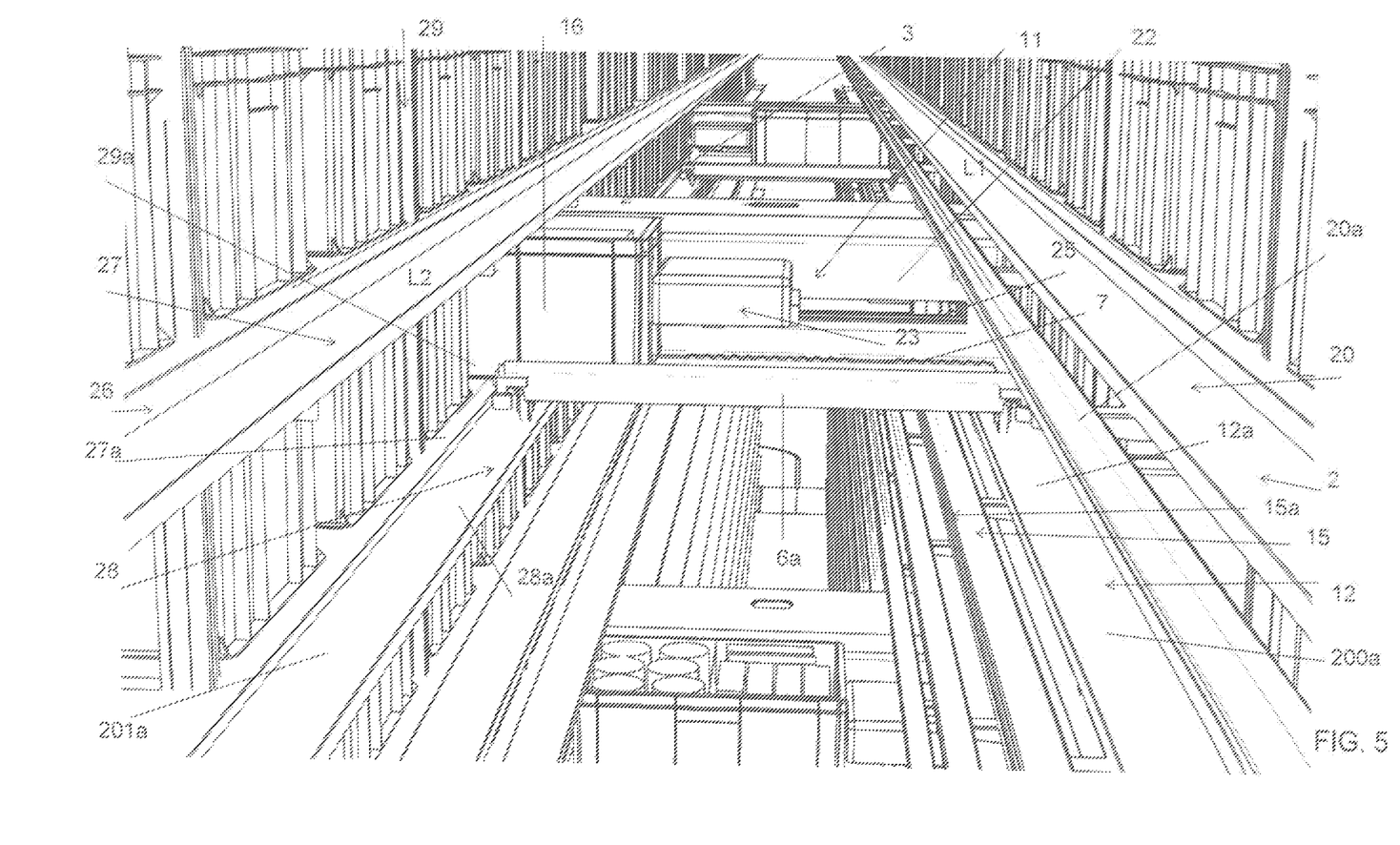

In detail, with reference to FIGS. 4 and 5, the drawers (16) containing articles can be arranged in each seat (17a) of the plurality of seats (17), with the drawers (16) being transported by the plurality of transport vehicles (6).

Each transport vehicle (6), during the transport of the articles (3) between the sorting station (4) and the supports of the plurality of supports (20), supports the articles (3) in such a way that they are arranged on the housing (7).

By way of example, the lifting means (13) and the lowering means (14) can respectively be a first hoist (13a) and a second hoist (14a).

The electric battery (8) of each transport vehicle (6a) of the plurality of transport vehicles (6) is at least partly charged while the transport vehicle (6a) runs along a corresponding electrified track (15a) of the plurality of electrified tracks (15). To maximise the electrical recharging of the electric battery (8), the advancement velocity of the transport vehicle (6a) can be regulated up to halting it in a point of a plane (200a) of the plurality of planes (200) of a shelf (2) in which the activity of the other transport vehicles is not hampered.

This is very advantageous because it avoids the use of electrical recharging stations at the transit area (5), which are instead present in the storage assembly of the prior art, described in the foregoing.

The control unit (80) of each transport vehicle (6a) of the plurality of transport vehicles (6) can be connected to a remote station for coordinating the actions of each transport vehicle (6a).

Each transport vehicle (6a) of the plurality of transport vehicles (6) can comprise movement means (18) which can be activated by an electric motor which, in turn, can be powered by the relative electric battery (8).

The movement means (18) can comprise two drive wheels (18a) and two idle wheels (18b).

Each drive wheel of the two drive wheels (18a) can be a drive wheel powered by a relative motor.

The electrical connector (9) can be a graphite brush.

The guides (12a) of the plurality of guides (12) can support each transport vehicle (6a) while it is crossing a predetermined plane (200a) of the plurality of planes (200).

The transit area (5) preferably comprises a guide pathway (19) and each transport vehicle (6a) of the plurality of transport vehicles (6) comprises a sensor (21) for detecting the guide pathway (19) during the transit in the transit area (5).

The guide pathway (19) is advantageously a predefined and guided pathway so that possible interferences between one or more transport vehicles of the plurality of transport vehicles (6) in the transit area (5) can be avoided.

Further, in this way the movement times of each transport vehicle (6a) of the plurality of transport vehicles (6) in the transit area (5) will be optimised since each transport vehicle (6a) is forced to follow the predetermined guide pathway (19).

The guide pathway (19) can be a magnetic guided pathway (19).

The transit area (5) can be free of electrified tracks.

Alternatively, the transit area (5) can comprise at least an electrified track (15b) arranged in proximity of the sorting station (4) (see FIGS. 1 and 2).

The guide pathway (19) is predisposed in the transit area (5) so that each transport vehicle (6a), following the guide pathway (19), reaches the sorting station (4) to the shelf (2), or vice versa, in the shortest possible time.

The guide pathway (19) preferably extends along the transit area (5) through straight and curved portions starting from the sorting station (4) up to arriving at the shelf (2).

Each transport vehicle (6a) advantageously travels the guide pathway (19) from the sorting station (4) up to reaching the shelf (2), thus optimising the relative movement times in the transit area (5).

In a preferred embodiment of the storage assembly (1), object of the present invention, starting from the sorting station (4), each transport vehicle (6a) of the plurality of transport vehicles (6) can transit into the transit area (5) travelling along the guide pathway (19) up to reaching the vicinity of the first flank (2a) of the shelf (2), with the aim of being raised by the first hoist (13a) on a predetermined plane (200a) of the plurality of planes (200).

Subsequently, after the transport vehicle (6a) has entirely travelled along the predetermined plane (200a), the second hoist (14a) lowers the transport vehicle (6a) towards the transit area (5) so that it can newly travel on the guide pathway (19) and reach the sorting station (4).

While the transport vehicle (6a) runs along the predetermined plane (200a) the relative electrical connector (9) scrapes on a corresponding electrified track (15a), determining the at least partial electrical recharging of the relative electric battery (8).

Figure 3:
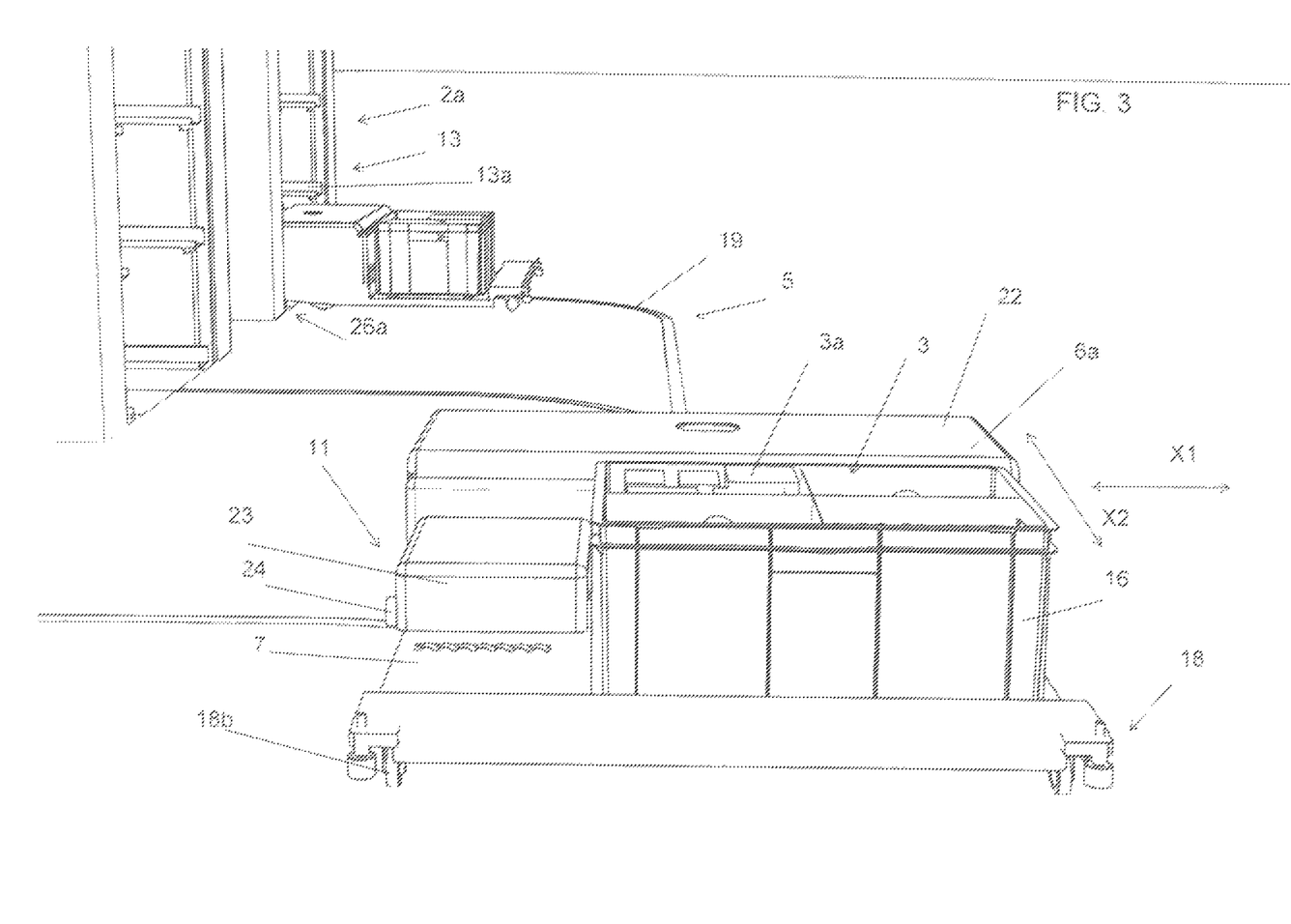
FIG. 3 is a larger-scale perspective view of detail K1 of FIG. 1 in the direction indicated by arrow K2.

Each transport vehicle (6a) of the plurality of transport vehicles (6) preferably comprises a frame (22) and the housing (7) of each transport vehicle (6a) projecting laterally with respect to the frame (22); the housing (7) of each transport vehicle (6a) has a first extension direction (X1) and a second extension direction (X2), which is transversal to the first extension direction (X1); the loading and unloading means (11) are mounted on-board each transport vehicle (6a) of the plurality of transport vehicles (6) and are translatable along the first extension direction (X1) of the housing (7) (see FIG. 3, in which the second extension direction is represented by a line moving out of the sheet).

The loading and unloading means (11) are suitable for loading at least an article (3a) to be transported or which is being transported so as to be positioned on the housing (7) or moved away from the housing (7).

The loading and unloading means (11) can comprise a carriage (23) and an electromagnetic picking-up system (24) borne by the carriage (23). The carriage (23) runs along a guide (25) arranged on the frame (22) of each transport vehicle (6a), which guide (25) extends parallel to the first extension direction (X1) so that the carriage (23) can slide along the first extension direction (X1) of the housing (7).

By way of example, the electromagnetic picking-up system (24) can comprise suckers or grippers borne by the carriage (23).

Alternatively to the electromagnetic picking-up system (24), the loading and unloading means (11) can comprise grippers or magnets or suckers provided with a vacuum pump. The housing (7) can be a support plane.

The loading and unloading means (11), when they are mounted on-board each transport vehicle (6a), they can be powered by the electric battery (8) of each transport vehicle (6a).

With particular reference to FIGS. 4 and 5, in the storage assembly (1) of the present invention, during operation the loading and unloading means (11) of each transport vehicle (6a) can be activated, while the transport vehicle (6a) runs along a predetermined plane (200a) of the plurality of planes (200), to translate the carriage (23) along the guide (25) so that the electromagnetic picking-up system (24) can grip the articles (3) arranged on the housing (7) to release them into the relative seat (17a) of the predetermined support (20a).

Alternatively, the loading and unloading means (11) of each transport vehicle (6a) can be activated, while the transport vehicle (6a) runs along a predetermined plane (200a) of the plurality of planes (200), to translate the carriage (23) along the guide (25) so that the electromagnetic picking-up system (24) can grip the articles (3) arranged on in the relative seat (17a) of the predetermined support (20a) to arrange them on the housing (7) of the transport vehicle (6a).

Each plane (200a) of the plurality of planes (200) of the shelf (2) can comprise a first longitudinal side (L1) and a second longitudinal side (L2), which extends in such a way as to face the first longitudinal side (L1); and wherein each guide (12a) of the plurality of guides (12) can be arranged in such a way as to extend parallel to the first longitudinal side (L1) of each plane (200a) of the plurality of planes (200) of the shelf (2) so that each transport vehicle (6a) of the plurality of transport vehicles (6) can run along the first longitudinal side (L1) of each plane (200a) of the plurality of planes (200) guided by the corresponding guide (12a) of the plurality of guides (12).

Each vehicle of the (6a) of the plurality of transport vehicles (6) can run parallel to the first longitudinal side (L1) of a predetermined plane (200) of the plurality of planes (200).

Each electrified track (15a) of the plurality of electrified tracks (15) preferably extends parallel to each guide (12a) of the plurality of guides (12) so that, when a transport vehicle (6a) of the plurality of transport vehicles (6) runs along a predetermined plane (200a) of the plurality of planes (200), the transport vehicle (6a) is guided by the guide (12a) of the plurality of guides (12) which is arranged flanked to the predetermined plane (200a) and the relative electrical connector (9) of the transport vehicle (6a) scrapes on the electrified track (15a) of the plurality of electrified tracks (15) which extends along the predetermined plane (200a).

The electrical recharging of the electric battery (8) advantageously takes place when each transport vehicle (6a) runs along the predetermined plane (200a) guided by the guide (12a) of the plurality of guides (12).

Each electrified track (15a) of the plurality of electrified tracks (15) can extend parallel to the first longitudinal side (L1) of each plane (200a) of the plurality of planes (200).

The shelf (2) can have a vertical extension.

Each plane (200a) of the plurality of planes (200) can be arranged superiorly of an underlying plane.

Each plane (200a) of the plurality of planes (200) can comprise a controller to regulate the voltage value and the current intensity of the electrified track (15a) which is arranged flanked to the determined plane (200a).

Each electrified track (15a) can be made of copper.

The storage assembly (1) preferably comprises:
a second shelf (26) which in turn comprises: a first flank (26a) and a second flank (26b) which is opposite the first flank (26a); a second plurality of planes (201); and a second plurality of supports (27) for supporting articles (3), which are arranged at the planes (201a) of the second plurality of planes (201);
a second plurality of guides (28) which are arranged flanked to the supports (27a) of the second plurality of supports (27) and which extend along the planes (201a) of the second plurality of planes (201) in order to guide the transport vehicles (6a) of the plurality of transport vehicles (6).

The second shelf (26) can be arranged opposite the shelf (2) so that each plane (200a) of the plurality of planes (200) faces each corresponding plane (201a) of the second plurality of planes (201).

The sorting station (4) is suitable for supplying articles (3) to be deposited on the supports (27a) of the second plurality of supports (27) and/or for receiving articles (3) in arrival from the supports (27a) of the second plurality of supports (27), the plurality of transport vehicles (6) can be suitable for transporting articles (3) between the sorting station (4) and the supports (27a) of the second plurality of supports (27); the first plurality of guides (12) and the second plurality of guides (28) being arranged in such a way that the loading and unloading means (11) can carry out the loading and unloading operations of the articles (3).

Further, the plurality of planes (200) with the relative plurality of guides (12) and the second plurality of planes (201) with the relative second plurality of guides (28) can be arranged at a distance from one another so that each transport vehicle (6a) can contemporaneously run along a predetermined plane (200a) of the plurality of planes (200) and along a corresponding plane (201a) of the second plurality of planes (201), which corresponding plane (201a) of the second plurality of planes (201) faces the predetermined plane (200a) of the plurality of planes (200), when the transport vehicle (6a) is guided, respectively, on one side by the relative guide (12a) of the plurality of guides (12) and on the other side by the relative guide (28a) of the second plurality of guides (28).

Each support (27a) of the second plurality of supports (27) can comprise a second plurality of seats (29) in which the articles (3) are arranged or will be arranged.

Each transport vehicle (6a) can advantageously contemporarily run along a predetermined plane (200a) of the plurality of planes (200) and a corresponding plane (201a) of the second plurality of planes (201).

Each transport vehicle (6a) of the plurality of transport vehicles (6) can have a length of 600 mm.

Therefore, a guide (12a) of the plurality of guides (12) is distant from a guide (28a) of the second plurality of guides (28) of a value identical to the width of the transport vehicle (6a) so that the transport vehicle (6a) can run with a drive wheel of the two drive wheels (18a) and with an idle wheel of the two idle wheels (18b) on the guide (12a) of the plurality of guides (12) and can run with the other drive wheel of the two drive wheels (18a) and with the other idle wheel of the two idle wheels (18b) on the guide (28a) of the second plurality of guides (28).

The loading and unloading means (11) are preferably suitable for loading at least an article (3a), which is arranged on a support (27a) of the second plurality of supports (27), on a transport vehicle (6a) of the plurality of transport vehicles (6) and for unloading at least an article (3a), which is arranged on a transport vehicle (6a) of the plurality of transport vehicles (6), on a support (27a) of the plurality of supports (27).

The second plurality of guides (28) can be conformed to support the transport vehicles of the plurality of transport vehicles (6) while it travels across a corresponding plane (201a) of the second plurality of planes (201).

The loading and unloading means (11) advantageously mounted on-board each transport vehicle (6a) of the plurality of transport vehicles (6) can contemporaneously carry out the loading and unloading operations of the articles (3) both in relation to a predetermined plane (200a) of the plurality of planes (200) and in relation to a corresponding plane (201a) of the second plurality of planes (201).

The lifting means (13) are preferably arranged at the first flank (26a) of the second shelf (26) for lifting a transport vehicle (6a) of the plurality of transport vehicles (6) towards a plane (201a) of the second plurality of planes (201) which faces the predetermined plane (200a) of the plurality of planes (200) and the lowering means (14) are arranged at the second flank (26b) of the second shelf (26) for lowering each transport vehicle (6a) of the plurality of transport vehicles (6) from a plane (201a) of the second plurality of planes (201) towards the transit area (5), after the transport vehicle (6a) has entirely travelled along the predetermined plane (200a) of the plurality of planes (200) and along the corresponding plane (201a) of the second plurality of planes (201).

The guide pathway (9) can extend along the transit area (5) through straight and curved portions starting from the sorting station (4) up to arriving at the second shelf (26).

With particular reference to FIGS. 2, 4-6, once the first hoist (13a) has lifted a transport vehicle (6a) at a predetermined plane (200a) of the plurality of planes (200), the transport vehicle (6a) will also be lifted at a corresponding plane (201a) of the second plurality of planes (201), in detail the plane (201a) of the second plurality of planes (201) facing the predetermined plane (200a) of the plurality of planes (200) (see FIG. 2). At this point, the transport vehicle (6a), moving along the plurality of planes (200) and along the second plurality of planes (201), will be positioned at a determined seat (17a), which seat (17a) will have an opposite seat (29a) in the second plurality of supports (27).

The loading and unloading means (11) will be activatable, for example, to translate along the first extension direction (X1) with the aim of gripping the articles (3) present on the housing (7) and release the articles (3) in the seat (17a) in the plurality of supports (20) and, subsequently, the loading and unloading means (11) will be activatable to translate along the first extension direction (X1), in an opposite direction to the first direction, in order to collect, from the corresponding seat (29a) in the second plurality of supports (27), the articles (3) to be arranged on the housing (7) (see FIGS. 4 and 5).

Figure 6:
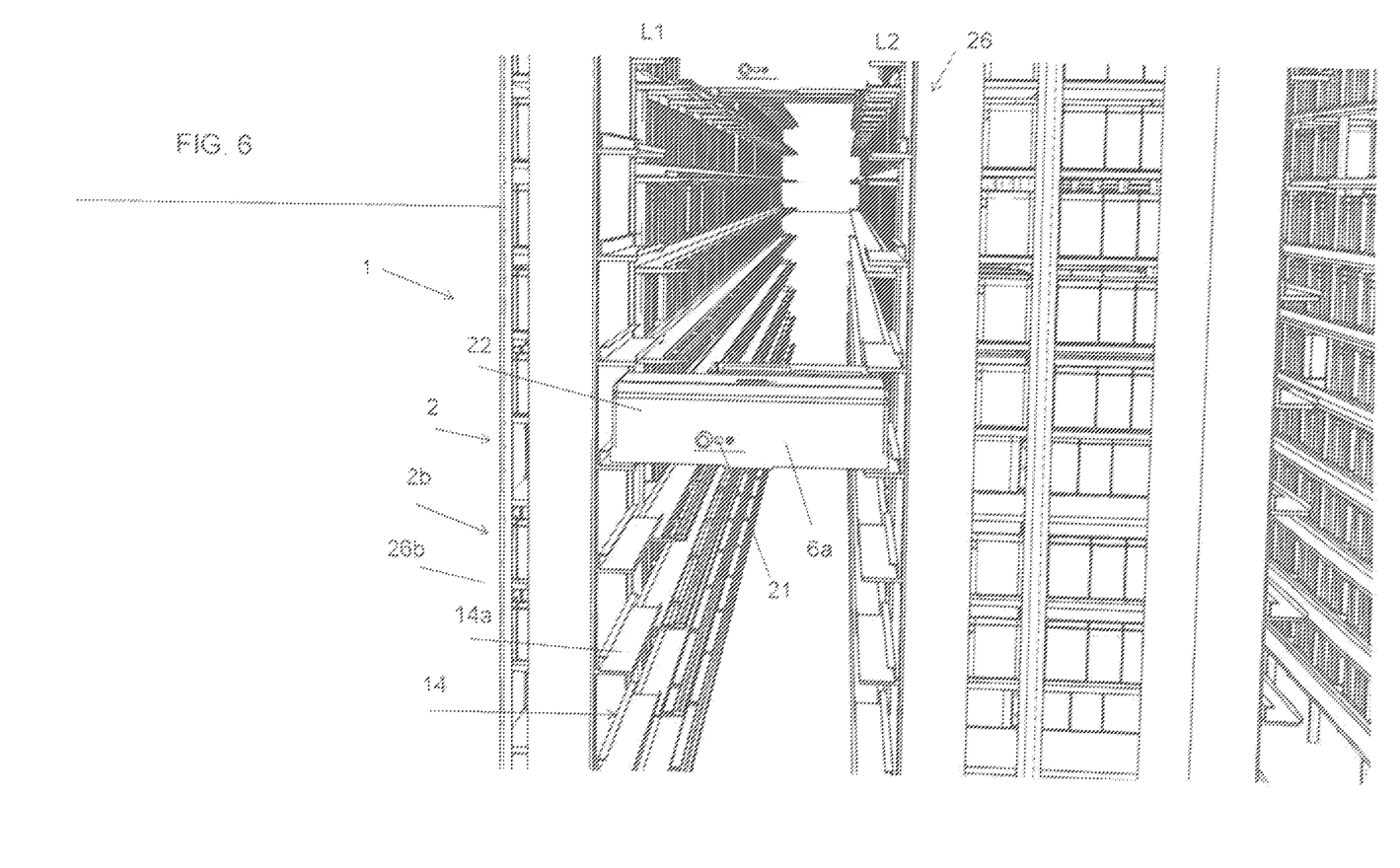

After the transport vehicle (6a) has entirely travelled along the predetermined plane (200a) of the plurality of planes (200) and along the corresponding plane (201a) of the second plurality of planes (201), the second hoist (14a) lowers the transport vehicle (6a) towards the transit area (5) (see FIG. 6).

It is specified that the same considerations made for the shelf (2) and for the plurality of supports (20) are valid also for the second shelf (26) and the second plurality of supports (27).

Likewise, the same consideration made for the plurality of planes (200) are also valid for the second plurality of planes (201).

By way of example, a preferred embodiment is described in the following.

Each plane (200a) of the plurality of planes (200) can have a minimum length of 3 metres and the relative electrified track (15a) can extend over the whole length of the plane (200a).

In the same way, each plane (201a) of the second plurality of planes (201) can have a minimum length of 3 metres.

As regards the plurality of electrified tracks (15), each electrified track (15a) of the plurality of electrified tracks (15) can have a voltage of 29 V.

Each electrified track (15a) can be supplied by the controller with a current intensity value that is variable according to the number of transport vehicles of the plurality of transport vehicles (6) that will cross it.

In detail, each electrified track (15a) can supply, to a single transport vehicle (6a) crossing it, a current intensity value of 15 A.

Each transport vehicle (6a) can include a pair of lithium batteries each having a voltage value of 24 V and a current intensity value of 20 A.

Further, each transport vehicle (15a) can include: a pair of electric motors which activate the two drive wheels (18a) and have a power value of 70 Watt; and a further motor which activates the gripping and release means (11) having an average consumption of 180 Watt per second. With particular reference to this last point, it is specified that the loading and unloading means (11) can take a second to collect at least an article (3a) from a predetermined plane (200a) or to release at least an article (3a) onto a predetermined plane (201a).

For each transport vehicle (6a), for each metre of electrified track (15a) crossed there will be a recharging of 1.5% of the relative electric battery (8).

Each transport vehicle (6a) can cross a plane (200a) of the plurality of planes (200) or a plane (201a) of the second plurality of planes (201a) with a velocity of 2 m/sec. The transport vehicle (6a) can also cross the transit area (5) at that velocity. The pathway of the transport vehicle (6a) can be done with a charge placed on the housing (7), which for example can be the drawer (16) containing articles (3), having a maximum weight value of 25 Kg.

The following is a description of a method for storing articles inside a storage assembly (1), also an object of the present invention, with the storage assembly (1) comprising:

a shelf (2) which in turn comprises: a first flank (2a) and a second flank (2b) which is opposite the first flank (2a); a plurality of planes (200); and a plurality of supports (20) for supporting articles (3), which are arranged at the planes (200a) of the plurality of planes (200);

a plurality of transport vehicles (6) for transporting articles (3), each transport vehicle (6a) of the plurality of transport vehicles (6) comprising an electric battery (8) for electrically powering the transport vehicle (6a) and an electrical connector (9) which is connected to the electric battery (8) for electrically recharging the electric battery (8);

a plurality of electrified tracks (15) which extend along each plane (200a) of the plurality of planes (200) of the shelf (2) for recharging the electric battery (8) of the plurality of transport vehicles (6) by scraping of the above-mentioned electrical connector (9).

The method comprises steps of:

lifting, at the first flank (2a) of the shelf (2), a transport vehicle (6a) of the plurality of transport vehicles (6) towards a plane (200a) of the plurality of planes (200);

lowering, at the second flank (2b) of the shelf (2) the transport vehicle (6a), the plurality of transport vehicles (6) from the plane (200a) of the plurality of planes (200), after the transport vehicle (6a) has entirely travelled along the plane (200a) of the plurality of planes (200);

regulating the velocity with which the transport vehicle (6a) runs along the plane (200) of the plurality of planes (200), on a corresponding electrified track (15a) of the plurality of electrified tracks (15) in accordance with the charge status of the relative electric battery (8).

This method can be actuated by means of the storage assembly (1), object of the present invention.

The same considerations as the above are also valid with regard to the method.

The invention claimed is:

1. A storage assembly, comprising:
a first shelf which comprises: a first flank and a second flank which is opposite the first flank; a first plurality of planes; and a first plurality of supports for supporting articles, which are arranged at the planes of the first plurality of planes;
a sorting station for supplying articles to be deposited on the supports of the first plurality of supports and/or for receiving articles in arrival from the supports of the first plurality of supports;
a transit area which is interposed between the first shelf and the sorting station;
a plurality of transport vehicles for transporting articles between the sorting station and the supports of the first plurality of supports of the first shelf, each transport vehicle of the plurality of transport vehicles comprising a housing for receiving one or more articles;

loading and unloading means for loading at least an article, which is arranged on a support of the first plurality of supports, on a transport vehicle of the plurality of transport vehicles and for unloading at least an article, which is arranged on a transport vehicle of the plurality of transport vehicles, on a support of the first plurality of supports;

a first plurality of guides which are arranged flanked to the supports of the first plurality of supports and which extend along the planes of the first plurality of planes in order to guide the transport vehicles of the plurality of transport vehicles so that the loading and unloading means can carry out the loading and unloading operations of the articles;

lifting means which are arranged at the first flank of the first shelf for lifting a transport vehicle of the plurality of transport vehicles towards a plane of the first plurality of planes, and lowering means which are arranged at the second flank of the first shelf for lowering the transport vehicle of the plurality of transport vehicles from the plane of the first plurality of planes towards the transit area, after the transport vehicle has entirely travelled along the plane of the first plurality of planes;

wherein:

each transport vehicle of the plurality of transport vehicles comprises an electric battery for electrically powering the transport vehicle, a control unit connected to the electric battery for detecting the electrical charge status of the electric battery and an electrical connector which is connected to the electric battery for electrically recharging the electric battery;

the storage assembly comprises a plurality of electrified tracks which are arranged flanked to the guides of the first plurality of guides and which extend along each plane of the plurality of planes of the first shelf;

the electrified track of each plane of the first plurality of planes of the first shelf extends over the whole length of the plane;

the storage assembly is configured so that, when a transport vehicle of the plurality of transport vehicles runs along a predetermined plane of the first plurality of planes, then the electrical connector of the transport vehicle scrapes on a corresponding electrified track of the plurality of electrified tracks thus determining the at least partial electrical recharging of the electric battery of the transport vehicle; and the control unit is programmed to regulate the velocity with which each transport vehicle will have to move along a predetermined plane of the first plurality of planes with the aim of maximising the recharging of the electric battery of the transport vehicle.

2. The storage assembly of claim 1, wherein the transit area comprises a guide pathway and wherein each transport vehicle of the plurality of transport vehicles comprises a sensor for detecting the guide pathway during the transit in the transit area.

3. The storage assembly of claim 2, wherein the guide pathway extends along the transit area through straight and curved portions starting from the sorting station up to arriving at the first shelf.

4. The storage assembly of claim 1, wherein: each transport vehicle of the plurality of transport vehicles comprises a frame and the housing of each transport vehicle projecting laterally with respect to the frame; the housing of each transport vehicle has a first extension direction and a second extension direction, which is transversal to the first extension direction; the loading and unloading means are mounted on-board each transport vehicle of the plurality of transport vehicles and are translatable along the first extension direction of the housing.

5. The storage assembly of claim 1, wherein each plane of the first plurality of planes of the first shelf comprises a first longitudinal side and a second longitudinal side, which extends in such a way as to face the first longitudinal side; and wherein each guide of the first plurality of guides is arranged in such a way as to extend parallel to the first longitudinal side of each plane of the first plurality of planes of the first shelf so that each transport vehicle of the plurality of transport vehicles can run along the first longitudinal side of each plane of the first plurality of planes guided by the corresponding guide of the first plurality of guides.

6. The storage assembly of claim 1, wherein each electrified track of the plurality of electrified tracks extends parallel to each guide of the first plurality of guides so that, when a transport vehicle of the plurality of transport vehicles runs along a predetermined plane of the first plurality of planes, the transport vehicle is guided by the guide of the first plurality of guides which is arranged flanked to the predetermined plane and the relative electrical connector of the transport vehicle scrapes on the electrified track of the plurality of electrified tracks which extends along the predetermined plane.

7. The storage assembly of claim 1, comprising:

a second shelf which in turn comprises: a first flank and a second flank which is opposite the first flank; a second plurality of planes; and a second plurality of supports for supporting articles, which are arranged at the planes of the second plurality of planes;

a second plurality of guides which are arranged flanked to the supports of the second plurality of supports and which extend along the planes of the second plurality of planes in order to guide the transport vehicles of the plurality of transport vehicles;

and wherein:

the second shelf is arranged opposite the first shelf so that each plane of the first plurality of planes of the first shelf faces each corresponding plane of the second plurality of planes;

the sorting station is suitable for supplying articles to be deposited on the supports of the second plurality of supports and/or for receiving articles in arrival from the supports of the second plurality of supports;

the plurality of transport vehicles is suitable for transporting articles between the sorting station and the supports of the second plurality of supports;

the first plurality of planes with the first plurality of guides of the first shelf and the second plurality of planes with the second plurality of guides of the second shelf are arranged at a distance in opposed alignment from one another so that each transport vehicle can contemporaneously run along a predetermined plane of the first plurality of planes of the first shelf and along a corresponding plane of the second plurality of planes of the second shelf, which corresponding plane of the second plurality of planes of the second shelf faces the predetermined plane of the first plurality of planes of the first shelf, when the transport vehicle is guided, respectively, on one side by the guide of the first plurality of guides of the first shelf and on the other side by the guide of the second plurality of guides of the second shelf.

8. The storage assembly of claim 7, wherein: the loading and unloading means are suitable for loading at least an article, which is arranged on a support of the second plurality of supports of at least one of the first shelf and the second shelf, on a transport vehicle of the plurality of transport vehicles and for unloading at least an article, which is arranged on a transport vehicle of the plurality of transport vehicles, on a support of the first plurality of supports of the at least one of the first shelf and the second shelf.

9. The storage assembly of claim 7, wherein the lifting means are arranged at the first flank of the second shelf for lifting a transport vehicle of the plurality of transport vehicles towards a plane of the second plurality of planes which faces the predetermined plane of the first plurality of planes of the first shelf and the lowering means are arranged at the second flank of the second shelf for lowering each transport vehicle of the plurality of transport vehicles from a plane of the second plurality of planes towards the transit area, after the transport vehicle has entirely travelled along the predetermined plane of the first plurality of planes of the first shelf and along the corresponding plane of the second plurality of planes of the second shelf.

10. A method for storing articles internally of a storage assembly, the storage assembly, comprising:
- a shelf which in turn comprises: a first flank and a second flank which is opposite the first flank; a first plurality of planes; and a first plurality of supports for supporting articles, which are arranged at the planes of the first plurality of planes;
- a plurality of transport vehicles for transporting articles, each transport vehicle of the plurality of transport vehicles comprising an electric battery for electrically powering the transport vehicle and an electrical connector which is connected to the electric battery for electrically recharging the electric battery;
- a plurality of electrified tracks which extend along each plane of the first plurality of planes of the shelf for recharging the electric battery of the plurality of transport vehicles by scraping of the above-mentioned electrical connector;
- the electrified track of each plane of the first plurality of planes of the first shelf extends over the whole length of the plane;
- the method comprises steps of:
- lifting, at the first flank of the shelf, a transport vehicle of the plurality of transport vehicles towards a plane of the first plurality of planes;
- lowering, at the second flank of the shelf, the transport vehicle of the plurality of transport vehicles from the plane of the first plurality of planes, after the transport vehicle has entirely travelled along the plane of the first plurality of planes;
- regulating the velocity with which the transport vehicle runs along the plane of the first plurality of planes, on a corresponding electrified track of the plurality of electrified tracks to maximise a charge status of the electric battery of the transport vehicle.

* * * * *